United States Patent
Mori

[15] 3,675,555
[45] July 11, 1972

[54] FILM LOCKING DEVICE IN CAMERA

[72] Inventor: Masao Mori, Osaka, Japan

[73] Assignee: Minolta Camera Kabushiki Kaisha, Osaka, Japan

[22] Filed: April 24, 1970

[21] Appl. No.: 31,543

[30] Foreign Application Priority Data

May 9, 1969 Japan..................................44/42796

[52] U.S. Cl............................................95/31 FM, 95/31 R
[51] Int. Cl............................................G03b 1/04, G03b 1/62
[58] Field of Search........................................95/31 FM, 31 R

[56] References Cited

UNITED STATES PATENTS

| | | |
|---|---|---|
| 3,473,456 | 10/1969 | Peterson et al.................95/31 FM |
| 2,559,892 | 7/1951 | Mihalyi et al.................95/31 FM |
| 3,532,040 | 10/1970 | Ehgartner et al.................95/31 FM |
| 2,629,302 | 2/1953 | Mihalyi.................95/31 FM |

Primary Examiner—Samuel S. Matthews
Assistant Examiner—Russell E. Adams, Jr.
Attorney—Stanley Wolder

[57] ABSTRACT

A device comprises a film winding shaft, a winding knob disposed separately from the winding shaft, a cord or chain operatively connecting the shaft to the knob and a member for sensing the perforation of a film. In operative relationship with the perforation sensing member, locking members function to prevent rotation of the film winding shaft and winding knob upon completion of film winding.

7 Claims, 4 Drawing Figures

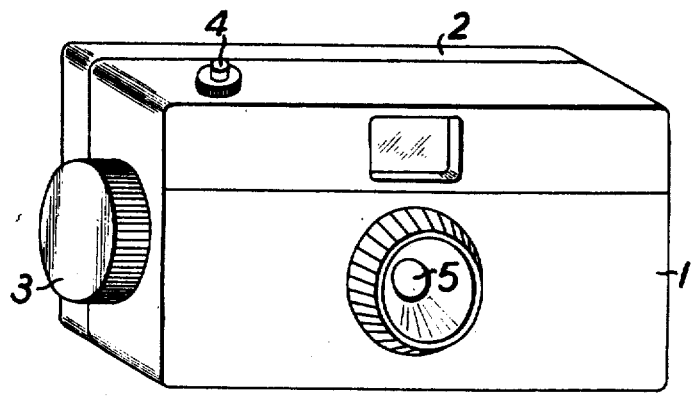
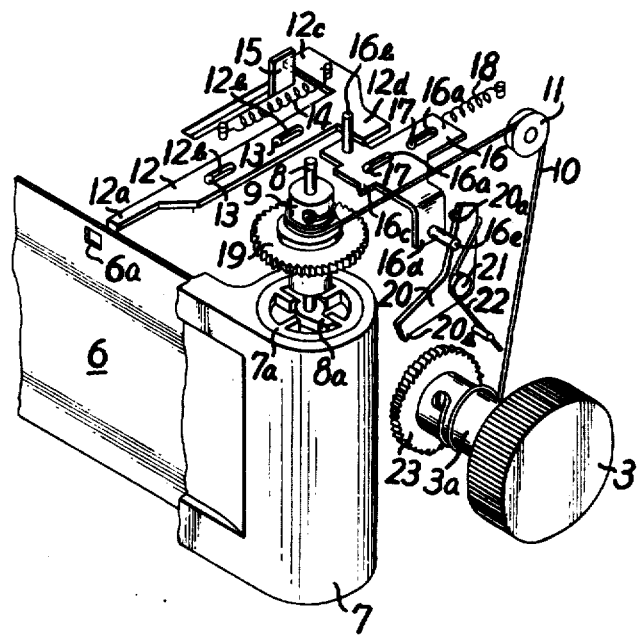

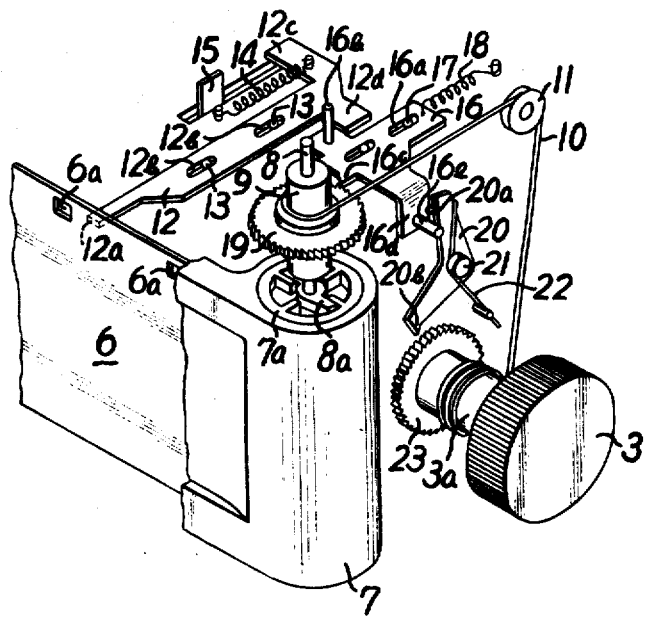
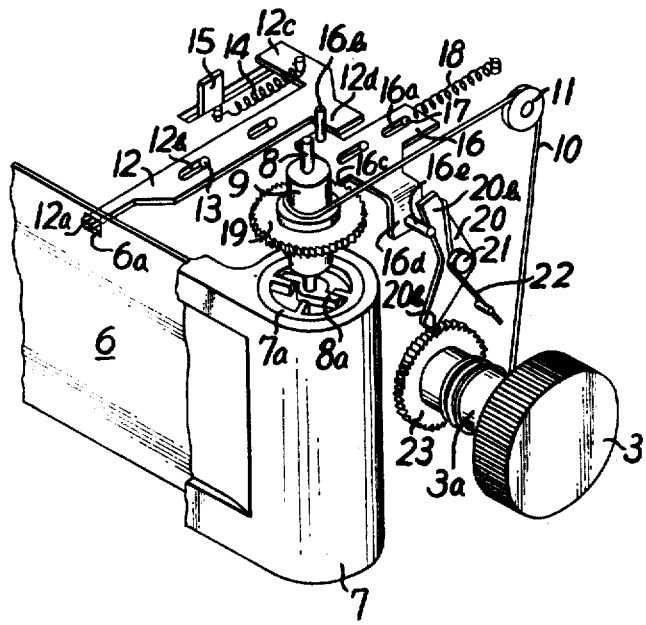

FILM LOCKING DEVICE IN CAMERA

BACKGROUND OF THE INVENTION

The present invention relates to a film locking device in a camera employing a cartridge loaded with a roll film and provided with a film metering mechanism, and more particularly to a film locking device in which winding knob shaft and film winding shaft are provided separately and connected by a cord or chain in operative relationship.

In accordance with conventional film winding mechanisms, the winding knob or lever is coaxially disposed with the film winding shaft, or when provided on separate shafts, the knob and shaft are associated with each other through a gear transmission system. In the case where it is impossible to provide the winding knob coaxially with the film winding shaft or to operatively connect the winding knob to the winding shaft by the gear transmission system due to the difficulties encountered in designing the appearance or in arranging the interior mechanisms, namely in case where there is a need to dispose the winding knob and film winding shaft at separate positions, it is advantageous to associate these two elements by a cord or chain in incorporating them in the camera together with other constituent mechanisms.

In the arrangement in which the two shafts are operatively related by a cord or chain, the transmission means (i.e., cord or chain) is subjected to a great tension when the film winding shaft is held in locked position after a predetermined length (i.e., one frame) of film has been wound up, so that there arises a necessity to provide locking means for preventing the winding knob from rotation so as to preclude further winding action and protect the transmission means against excess tension.

SUMMARY OF THE INVENTION

An object of the present invention is to provide a film locking device to be used in a camera incorporating a film metering mechanism and provided with a film winding knob and a film winding shaft which are disposed at separate positions and operatively connected by a cord or chain, the film locking device being capable of acting on the film winding knob as well as on the film winding shaft.

Another object of the present invention is to provide a film locking device of the type described in a very simple structure.

The present invention is characterized by a structure comprising a film perforation sensing member for metering the film, locking members operatively connected with the sensing member, a ratchet wheel adapted to be rotated integrally with a film winding knob and another ratchet wheel adapted to be rotated integrally with the film winding shaft, the locking members being adapted to engage with the ratchet wheels respectively so as to prevent the film winding knOb and film winding shaft from rotation when the sensing member senses one of the perforations punched in the film at predetermined intervals.

With such structure, the cord or chain connecting the film winding knob to the film winding shaft in operative relationship is perfectly prevented from being subjected to excess tension. Since the locking members are constructed of a very small number of parts as will be described later, the present device is simple in structure and insures greater freedom in designing the construction of a film locking mechanism.

Other objects and features of the present invention will become more apparent from the following description.

BRIEF DESCRIPTION OF THE DRAWINGS

FIG. 1 is a perspective view showing a camera incorporating a device of the present invention; and FIG. 2, 3 and 4 are perspective views showing an embodiment with parts of the camera omitted which are not essential to an understanding of the present invention, the views illustrating sequential relative positions of the constituent parts during film winding operation.

DESCRIPTION OF THE PREFERRED EMBODIMENT

Referring to FIG. 1, a camera 1 is provided with a back 2 which is adapted for opening to mount a cartridge loaded with a roll film. As shown in FIGS. 2 to 4, film is wound up by operating a film winding knob 3. A shutter button, when depressed, actuates a shutter (not shown) incorporated in a lens assembly 5 to make a predetermined amount of exposure.

Referring to FIGS. 2, 3 and 4, designated at 6 is a film which is provided with perforations 6a at a predetermined interval (i.e., generally at a distance corresponding to one frame of film). As illustrated in the drawings, the roll film, loaded in a cartridge 7, is wound up by rotating a spool 7a of the cartridge 7 in the counterclockwise direction in the drawings. As already known in the art, adapted for engagement with the spool 7a is a pawl 8a at the lower end of a vertical shaft 8 to be moved upward or downward in operative relationship with opening or closing of the back 2. The vertical shaft 8 extending through a hole in the film winding shaft 9 is adapted for rotation by the film winding shaft 9 and uni-directional rotation means (not shown) such as a ratchet mechanism when the shaft 9 is driven in the counterclockwise direction. By means of a cord 10 the film winding shaft 9 is connected to a shaft 3a of the film winding knob 3, which, when rotated in the clockwise direction, rotates the film winding shaft 9 in the counterclockwise direction. One end of the cord 10 is secured to the film winding shaft 9 and entwined around the shaft 9 several turns, while the other end of the cord 10 is secured to the shaft 3a of the film winding knob 3 and wrapped around the shaft 3a several turns. A pulley 11 guides the cord 10. Accordingly, when the film winding knob 3 is rotated, the cord 10 is wound around the shaft 3a and unwound from the film winding shaft 9 so as to rotate the film winding shaft 9 in the counterclockwise direction. The vertical shaft 8 is therefore rotated and the pawl 8a further drives the spool 7a of the cartridge 7 for film winding.

The provision of the foregoing structure in which the film winding knob 3 is operatively connected to the film winding shaft 9 by the cord 10 makes it possible to dispose the film winding knob 3 at the desired position on the side of the camera 1 as shown in FIG. 1. Since the cord 10 itself requires only a very small space when it is disposed in the camera such structure insures much greater freedom in designing a camera.

When the film is locked in position after film winding operation has been completed, the film winding shaft 9 is turned clockwise to the original position independently of the vertical shaft 8 by known means (not shown) such as a spiral spring, with the result that one end of the cord is rewound around the film winding shaft 9 while the other end is unwound from the shaft 3a of the film winding knob. The clockwise rotation of the knob shaft 3a during winding operation described above brings the shutter to cocked position through a shutter setting mechanism. After film locking, the clockwise rotation of the film winding shaft 9 causes the knob shaft 3a to rotate in the counterclockwise direction. The counterclockwise rotation of the film winding knob shaft 3a takes place independently of the shutter setting mechanism.

Designated at 12 is a perforation sensing plate which is provided with an end 12a for engagement with the perforation 6a. Through provision of two guide pins 13 implanted in a holding plate (not shown) in the camera body and two slots 12b formed in the perforation sensing plate 12 for engagement with the guide pins 13, the plate 12 is adapted to be moved toward or away from the film 6 at a right angle therewith. The plate is urged toward film 6 by a tension spring 14. The perforations 6a are formed along one edge of the film 6 at a predetermined interval corresponding to one frame of the film.

A release member 15 for relieving locking action functions to operative relationship with the shutter mechanism (not shown). As the shutter is brought to cocked position by the shutter setting mechanism, the release member 15 is moved toward the film 6, whereas upon shutter release, it is quickly moved away from the film 6 to the original position, pushing an arm 12c of the sensing plate 12 against the action of the tension spring 14 to retract the plate 12 from the film 6.

Designated at 16 is a locking plate which is adapted to be moved in the same direction as the perforation sensing plate 12 by means of two guide pins 17 implanted in a holding plate within a camera body and two slots 16a formed in the locking plate 16 for engagement with the guide pins 17. A tension spring 18 urges the locking plate in a direction opposite to the sensing plate 12 and a pin 16b extendng from part of the locking plate 16 is held in contact with an arm 12d of the sensing plate 12. The tension spring 18 serves to cause the locking plate 16 to follow the movement of the sensing plate 12, the tension spring 18 being such that the sensing plate 12 will not be moved in opposition to the influence of spring 14 when subjected to the action of the tension spring 18 The locking plate 16 is formed with a pawl 16c at its end for engagement with a ratchet wheel 19 fixedly mounted on the film winding shaft 9.

A locking lever 20, supported on a pivot 21 implanted in the side of the camera body, is urged in the counterclockwise direction by a spring 22 for its tail end 20a to engage with a pin 16e extending from a bent arm 16 d of the locking plate 16, the locking lever 20 thus being adapted for pivotal movement in operative relationship with the locking plate 16. Provided at an end of the locking lever 20 is a pawl 20b for engagement with a ratchet wheel 23 keyed to the film winding knob shaft 3a, the engagement being effected by the above-mentioned pivotal movement.

In operative relationship with the operation of the perforation sensing plate 12 which is allowed to move toward or away from the film at a right angle therewith by the release member 15 and tension spring 14, the locking plate 16 is actuated into engagement with or disengaged from the ratchet wheel 19 at its pawl 16c and the locking lever 20 is engaged with or disengaged from the ratchet wheel 23 at its pawl 20b. To effect such movement, it is required that the force of the tension spring 14 be greater than that of tension spring 18 and the force of action exerted by the spring 18 is greater than that of the spring 22.

FIG. 2 illustrates the positions of the respective members of the present embodiment upon completion of shutter release. When the film winding knob 3 in this state is turned clockwise to wind up the film 6, the film winding shaft 9 is rotated in the counterclockwise direction by the cord 10 which is wound around the film winding knob shaft 3a. As a result, the spool 7a is rotated counterclockwise by the vertical shaft 8 for film winding. On the other hand, the shutter setting mechanism (not shown) brings the shutter into cocked position, while the release member 15 is brought toward the film 6. Due to this movement, the end 12a of the perforation sensing plate 12 which has been prevented from operation is also brought progressively toward the film 6 under the action of tension spring 14. Consequently, the pawls 16c and 20b at the respective ends of locking plate 16 and locking lever 20 are moved toward the ratchet wheel 19 and 23.

Upon completion of shutter setting through further clockwise rotation of the film winding knob 3, the release member 15 is brought to a halt at the position shown in FIG. 3. Before this takes place, however, the end 12a of the perforation sensing plate 12 is brought into contact with the surface of film 6 which is being wound up, whereupon the plate 12 is stopped at the position shown in FIG. 3 in spite of the foregoing movement of the release member 15 and the action of the tension spring 14 which urges the plate 12 forward. At the same time, the locking plate 16 and locking lever 20 are stopped at the positions shown in FIG. 3 with the pawls 16c and 20b retained in the positions immediately before engagement with the ratchet wheels 19 and 23.

In this state, a predetermined length of the film has not been fully wound up yet and the film winding knob 3 can be rotated further in the clockwise direction. Through further clockwise rotation of the film winding knob 3, the film 6 is travelled and wound around the spool 7a. At the position where a predetermined length is wound up, the film perforation 6a is positioned in front of the end 12a of sensing plate 12, so that upon sensing the perforation 6a, the end 12a of the plate 12 comes into engagement with the perforation 6a under the action of the tension spring 14. The sensing plate 12 is now brought to the position shown in FIG. 4 with the pawl 16c of the locking plate 16 and the pawl 20b of the locking lever 20 brought into engagement with ratchet wheels 19 and 23 respectively so as to prevent rotation of the film winding knob 3 and film winding shaft 9 as seen in FIG. 4. This prevention is effected almost simultaneously with the engagement of the sensing plate 12. Since the locking plate 16 functions under the action of the tension spring 14 and the locking lever 20 operates under the action of spring 22, trouble-free operation is insured even where the rotation ratio of the film winding knob 3 and film winding shaft 9 is different. Moreover, any excess tension to be exerted on the cord 10 after completion of film winding can be precluded.

If the film winding knob is released from the hand after completion of film winding or during film winding operation, the film winding knob shaft 3a and film winding shaft 9 are respectively returned, as already known, in the direction opposite to the winding direction independently of the shutter setting mechanism and film winding spool 7a. Accordingly, the cord which has been wound around the film winding knob shaft 3a is rewound around the film winding shaft 9.

When the shutter is released in the state shown in FIG. 4 for making exposure, the release member 15 is quickly moved away from the film by the shutter mechanism to push the arm 12c of the perforation sensing plate 12 against tension spring 14 and thereby release the end 12a of the plate 12 from the perforation 6a. At the same time, the tension spring 18 acts to retract the locking plate 16 and locking lever 20 so as to free the pawls 16c and 20b respectively from engagement with the ratchet wheels 19 and 23. The constituent members are thus brought back to the original positions shown in FIG. 2 for subsequent film winding operation.

I claim:

1. A film locking device in a camera employing film with index perforations comprising a film winding shaft rotatable in one direction to advance the film and resiliently urged to rotate in an opposite direction and a winding knob shaft disposed separately from a cord member for connecting said film winding shaft to said winding knob shaft in operative relationship for rotation, a sensing plate adapted to be operated upon sensing a film perforation, a first ratchet wheel mounted on said film winding shaft, a second ratchet wheel mounted on said winding knob shaft, and a first locking member and a second locking member both adapted to be actuated in operative relationship with the movement of said sensing plate, said first locking member being associated with said first ratchet wheel, said second locking member being associated with said second ratchet wheel, whereby said film winding shaft and winding knob shaft are prevented from rotation when said sensing plate senses a film perforation and means responsive to the release of the camera shutter for retracting said sending plate and said locking members.

2. In a photographic camera using an elongated strip of roll film having a plurality of metering holes spaced therealong, said camera comprising:

a film winding shaft rotatable in one direction to advance said film strip and normally resiliently rotatably urged in an opposite direction independently of film advance;

a film winding knob shaft disposed separately from said film winding shaft;

a cord extending between and wound upon said film winding shaft and said knob shaft to rotatably couple said shafts;

sensing means including a sensing element movable between an advanced position engaging a registering metering hole and a retracted position spaced from said film strip and means urging said sensing element toward said film strip; and first locking means including a first ratchet wheel mounted on said winding knob shaft and a first locking member movable in response to the advance of said sensing element into advance locking engagement with said ratchet wheel and out of engagement with said ratchet wheel upon retraction of said sensing element.

3. The camera of claim 2 comprising second locking means including a second ratchet wheel mounted on said film winding shaft and a second locking member movable between advanced and retracted positions in and out of engagement with said second ratchet wheel with the movement of said first locking member into and out of engagement with said first ratchet wheel respectively.

4. The camera of claim 2 wherein said film winding shaft and said film winding knob shaft are perpendicular to each other.

5. The camera of claim 4 comprising means responsive to the release of the camera shutter for retracting said sensing element and said first and second locking members.

6. The camera of claim 2 comprising means responsive to the release of the camera shutter for retracting said sensing element and first locking member.

7. The camera of claim 1 wherein said shafts are perpendicular to each other.

* * * * *